United States Patent
Bai et al.

(10) Patent No.: US 11,652,530 B2
(45) Date of Patent: May 16, 2023

(54) BEAM FAILURE DETECTION REFERENCE SIGNAL SELECTION FOR SECONDARY CELLS

(71) Applicant: QUALCOMM Incorporated, San Diego, CA (US)

(72) Inventors: Tianyang Bai, Somerville, NJ (US); Yan Zhou, San Diego, CA (US); Jung Ho Ryu, Fort Lee, NJ (US); Tao Luo, San Diego, CA (US); Junyi Li, Chester, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/948,237

(22) Filed: Sep. 9, 2020

(65) Prior Publication Data

US 2021/0091843 A1    Mar. 25, 2021

Related U.S. Application Data

(60) Provisional application No. 62/902,735, filed on Sep. 19, 2019.

(51) Int. Cl.
*H04B 7/06* (2006.01)
*H04L 5/00* (2006.01)
(Continued)

(52) U.S. Cl.
CPC ........... *H04B 7/0695* (2013.01); *H04L 5/005* (2013.01); *H04W 24/08* (2013.01); *H04W 36/305* (2018.08); *H04W 76/19* (2018.02)

(58) Field of Classification Search
CPC .. H04B 7/0695; H04W 76/19; H04W 36/305; H04W 24/08; H04W 36/0033;
(Continued)

(56) References Cited

U.S. PATENT DOCUMENTS

| | | | |
|---|---|---|---|
| 2018/0219606 A1* | 8/2018 | Ng | H04L 5/0048 |
| 2018/0279287 A1* | 9/2018 | John Wilson | H04B 7/0695 |

(Continued)

FOREIGN PATENT DOCUMENTS

| | | | | |
|---|---|---|---|---|
| EP | 3579479 A1 * | 12/2019 | | H04B 7/0695 |
| EP | 3606214 A1 * | 2/2020 | | H04B 17/373 |
| WO | 2019027294 A1 | 2/2019 | | |

OTHER PUBLICATIONS

International Search Report and Written Opinion—PCT/US2020/070523—ISA/EPO—dated Dec. 1, 2020.

*Primary Examiner* — Ian N Moore
*Assistant Examiner* — Latresa A McCallum
(74) *Attorney, Agent, or Firm* — Harrity & Harrity, LLP

(57) ABSTRACT

Various aspects of the present disclosure generally relate to wireless communication. In some aspects, a user equipment may determine a set of beam failure detection reference signals to monitor for a set of secondary cells based at least in part on at least one of a cell configuration, a set of secondary cell reference signal selection rules, or a set of primary cell reference signal selection rules; monitor the set of beam failure detection reference signals based at least in part on determining the set of beam failure detection reference signals; and detect, based at least in part on monitoring the set of beam failure detection reference signals, a beam failure for a secondary cell of the set of secondary cells. Numerous other aspects are provided.

30 Claims, 6 Drawing Sheets

(51) Int. Cl.
*H04W 36/30* (2009.01)
*H04W 76/19* (2018.01)
*H04W 24/08* (2009.01)

(58) Field of Classification Search
CPC .. H04W 36/0079; H04W 16/18; H04L 5/005; H04L 41/145; H04L 43/00
See application file for complete search history.

(56) References Cited

U.S. PATENT DOCUMENTS

2019/0190582 A1\* 6/2019 Guo ...................... H04W 76/19
2019/0274098 A1 9/2019 Cheng et al.
2020/0274606 A1\* 8/2020 Kang ................ H04W 74/0833
2020/0322035 A1\* 10/2020 Shi ....................... H04B 7/0639
2020/0383167 A1\* 12/2020 Sengupta .......... H04W 72/0413

\* cited by examiner

BEAM FAILURE DETECTION REFERENCE SIGNAL SELECTION FOR SECONDARY CELLS

CROSS-REFERENCE TO RELATED APPLICATION

This Patent Application claims priority to U.S. Provisional Patent Application No. 62/902,735, filed on Sep. 19, 2019, entitled "BEAM FAILURE DETECTION REFERENCE SIGNAL SELECTION FOR SECONDARY CELLS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure detection reference signal selection for secondary cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a set of beam failure detection reference signals to monitor for a set of secondary cells based at least in part on at least one of a cell configuration, a set of secondary cell reference signal selection rules, or a set of primary cell reference signal selection rules; monitoring the set of beam failure detection reference signals based at least in part on determining the set of beam failure detection reference signals; and detecting, based at least in part on monitoring the set of beam failure detection reference signals, a beam failure for a secondary cell of the set of secondary cells.

In some aspects, a UE for wireless communication may include memory and one or more processors operatively coupled to the memory. The memory and the one or more processors may be configured to determine a set of beam failure detection reference signals to monitor for a set of secondary cells based at least in part on at least one of a cell configuration, a set of secondary cell reference signal selection rules, or a set of primary cell reference signal selection rules; monitor the set of beam failure detection reference signals based at least in part on determining the set of beam failure detection reference signals; and detect, based at least in part on monitoring the set of beam failure detection reference signals, a beam failure for a secondary cell of the set of secondary cells.

In some aspects, a non-transitory computer-readable medium may store one or more instructions for wireless communication. The one or more instructions, when executed by one or more processors of a UE, may cause the one or more processors to determine a set of beam failure detection reference signals to monitor for a set of secondary cells based at least in part on at least one of a cell configuration, a set of secondary cell reference signal selection rules, or a set of primary cell reference signal selection rules; monitor the set of beam failure detection reference signals based at least in part on determining the set of beam failure detection reference signals; and detect, based at least in part on monitoring the set of beam failure detection reference signals, a beam failure for a secondary cell of the set of secondary cells.

In some aspects, an apparatus for wireless communication may include means for determining a set of beam failure detection reference signals to monitor for a set of secondary cells based at least in part on at least one of a cell configuration, a set of secondary cell reference signal selection rules, or a set of primary cell reference signal selection rules; means for monitoring the set of beam failure detection reference signals based at least in part on determining the set of beam failure detection reference signals; and means for detecting, based at least in part on monitoring the set of beam failure detection reference signals, a beam failure for a secondary cell of the set of secondary cells.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
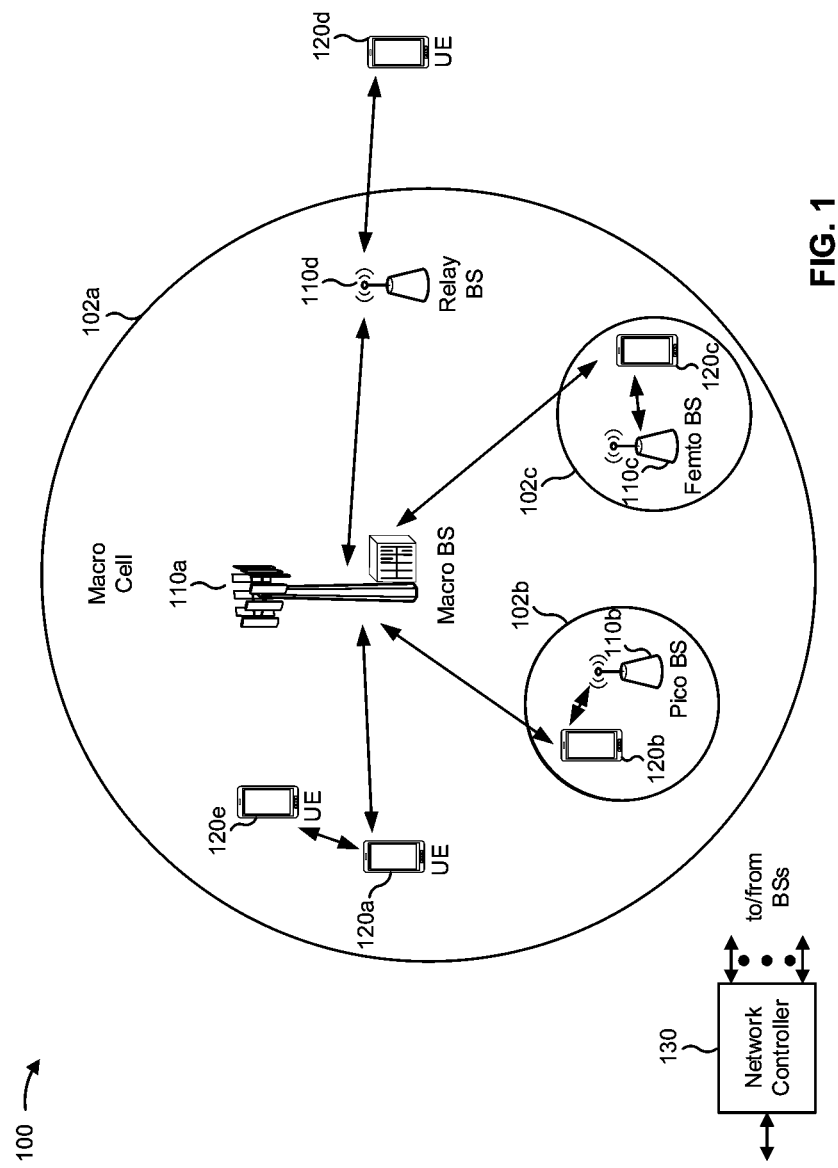
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
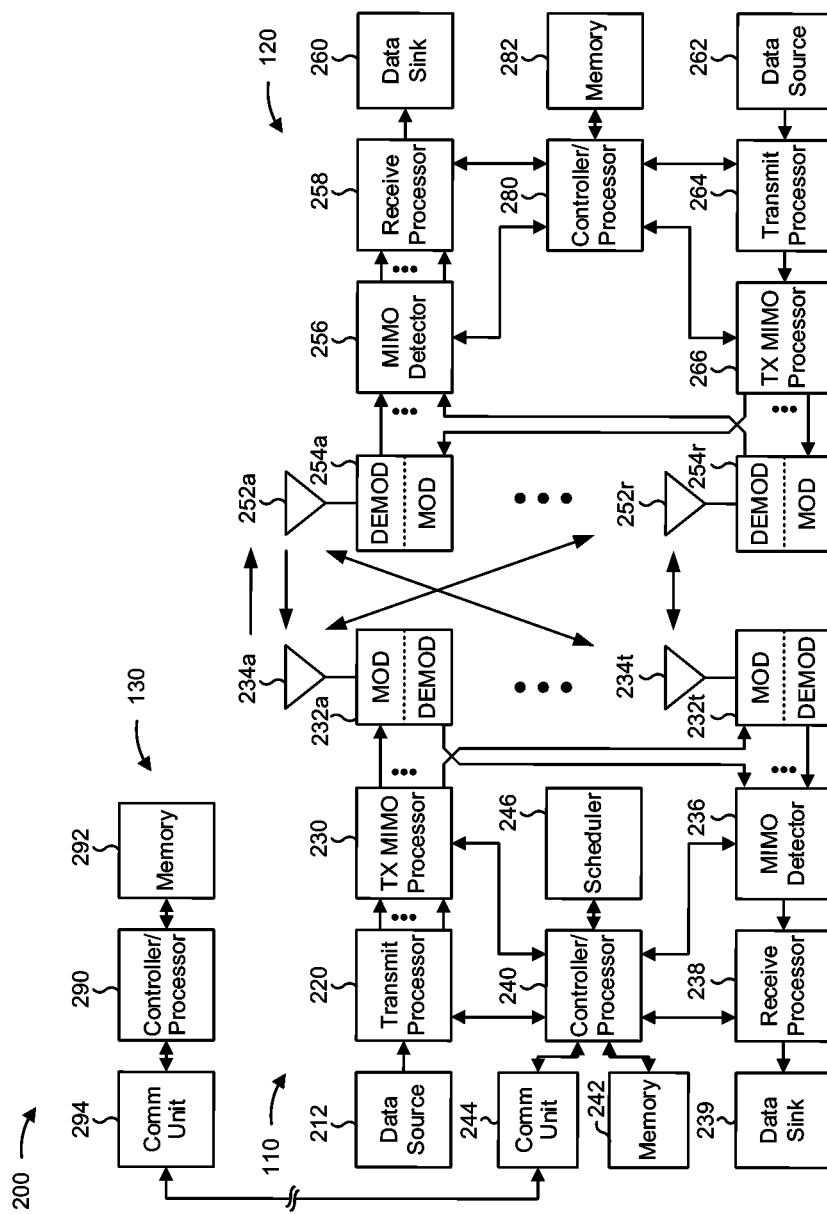
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam failure detection reference signal selection for secondary cells, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for determining a set of beam failure detection reference signals to monitor for a set of secondary cells based at least in part on at least one of a cell configuration, a set of secondary cell reference signal selection rules, or a set of primary cell reference signal selection rules; means for monitoring the set of beam failure detection reference signals based at least in part on determining the set of beam failure detection reference signals; means for detecting, based at least in part on monitoring the set of beam failure detection reference signals, a beam failure for a secondary cell of the set of secondary cells, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
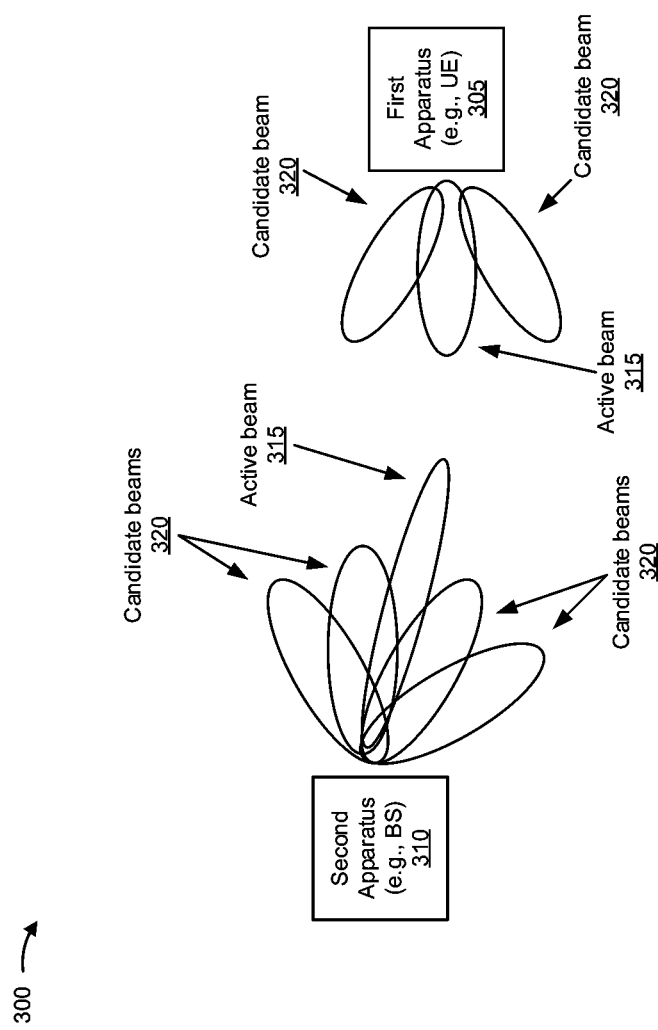
FIG. 3 is a diagram illustrating an example of wireless communication via one or more beams, in accordance with various aspects of the present disclosure.

FIG. 3 is a diagram illustrating an example 300 of wireless communication via one or more beams, in accordance with certain aspects of the present disclosure.

As shown in FIG. 3, a first apparatus 305 (e.g., shown as a UE, such as UE 120, in example 300) may communicate with a second apparatus 310 (e.g., shown as a BS, such as BS 110, in example 300) using one or more active beams 315. In some aspects, the first apparatus 305 and the second apparatus 310 may also be capable of communicating via one or more candidate beams 320. In some aspects, an active beam 315 may be selected from a set of candidate beams 320 by comparing beam parameters (e.g., RSRP, RSRQ, RSSI, and/or the like) of the set of candidate beams 320. For example, an active beam 315 may be the beam that has the best beam parameters among all beams in the set of candidate beams 320. In some aspects, the beams may operate in a millimeter wave radio frequency band.

In some aspects, if the active beam 315 experiences a failure, the first apparatus 305 may perform a beam failure recovery procedure. For example, upon detecting the failure of the active beam 315, the first apparatus 305 may attempt to communicate with the second apparatus 310 by transmitting a beam failure recovery request (BFRQ) via one or more candidate beams 320.

The first apparatus 305 may detect the failure based at least in part on monitoring one or more beam failure detection reference signals. For example, when first apparatus 305 determines that a measured RSRP of a beam failure detection reference signal satisfies a threshold, first apparatus 305 may determine that a beam failure has occurred. In some cases, second apparatus 310 may explicitly configure which beam failure detection reference signals, of a plurality of possible beam failure detection reference signals, first apparatus 305 is to monitor. For beams associated with a primary cell, when second apparatus 310 does not explicitly configure monitoring for first apparatus 305, first apparatus 305 may determine the beam failure detection reference signals based at least in part on a set of primary cell reference signal selection rules.

As indicated above, FIG. 3 is provided as an example. Other examples may differ from what is described with regard to FIG. 3.

Figure 4:
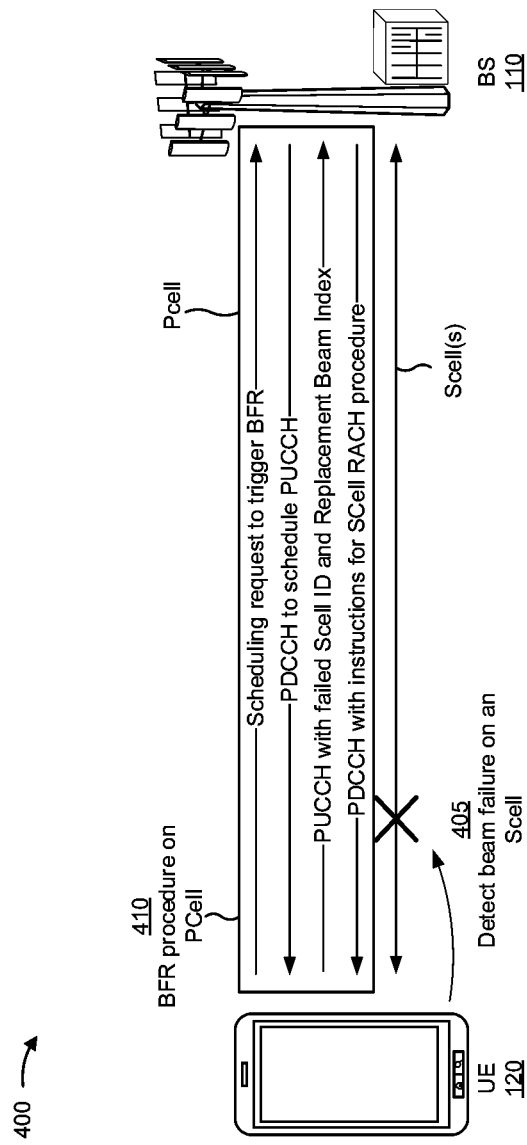
FIG. 4 is a diagram illustrating an example of a beam failure recovery procedure, in accordance with various aspects of the present disclosure.

FIG. 4 is a diagram illustrating an example 400 of a beam failure recovery procedure, in accordance with certain aspects of the present disclosure.

As shown in FIG. 4, a BS 110 and a UE 120 may communicate with one another using carrier aggregation. Using carrier aggregation, BS 110 and UE 120 may communicate with one another using a primary cell (PCell) and one or more secondary cells (SCells). In example 400, the secondary cells are DL-only secondary cells, meaning that the secondary cells are configured for only downlink communications, and are not configured for uplink communications. However, in some aspects, secondary cells may be configured for DL and UL, UL-only, DL-only, a combination thereof, and/or the like.

As shown by reference number 405, UE 120 may detect beam failure on a DL-only secondary cell. For example, UE 120 may detect the beam failure by monitoring for a beam failure detection reference signal on the DL-only secondary cell, as described in more detail herein. As shown by reference number 410, UE 120 and BS 110 may perform a beam failure recovery procedure using the primary cell. For example, the UE 120 may transmit a scheduling request on the primary cell via a physical uplink control channel (PUCCH). The scheduling request may trigger beam failure recovery (BFR), which may also be referred to as a link recovery procedure. Based at least in part on receiving the scheduling request, BS 110 may transmit, on the primary cell, a physical downlink shared channel (PDCCH) communication that schedules a PUCCH communication for BFR.

The UE 120 may receive the PDCCH communication, and may transmit the scheduled PUCCH communication on the primary cell. The PUCCH communication may identify the secondary cell that experienced the beam failure and/or may indicate a candidate beam index for a candidate beam to replace the failed beam. For example, the PUCCH communication may include a medium access control (MAC) control element (CE) (MAC-CE) that identifies the failed secondary cell and the replacement beam. Based at least in part on receiving the PUCCH communication, the base station 110 may transmit, on the primary cell, a PDCCH communication that instructs the UE 120 regarding the BFR procedure. For example, the PDCCH communication may instruct the UE 120 to perform a random access procedure for the secondary cell on one or more candidate beams. The UE 120 may perform BFR according to the PDCCH communication to obtain a new beam for communications on the secondary cell.

As indicated above, FIG. 4 is provided as an example. Other examples may differ from what is described with regard to FIG. 4.

As described above, a UE may detect a beam failure by monitoring for a beam failure detection reference signal. In primary cell operation, the UE and a BS may configure up to 3 control resource sets (CORESETs) and up to 2 beam failure detection reference signals. However, in secondary cell operation, additional quantities of CORESETs and/or beam failure detection reference signals may be possible. Additionally, or alternatively, with secondary cell grouping enabled, a plurality of beam failure detection reference signals may share a common CORESET. As a result, primary cell reference signal selection rules may not be applicable to secondary cell beam failure detection reference signal selection use cases.

Thus, some aspects described herein enable beam failure detection reference signal selection for secondary cells. For example, a UE may determine a set of beam failure detection reference signals to monitor based at least in part on a cell configuration, a set of secondary cell reference signal selection rules, and/or a set of primary cell reference signal selection rules. Based at least in part on using the set of secondary cell reference signal selection rules, the UE enables secondary cell beam failure detection reference signal selection in cases where primary cell reference signal selection rules result in ambiguity when applied to secondary cells. In this way, the UE increases a reliability of communications with the BS relative to only detecting beam failures on primary cells using beam failure detection reference signals selected based at least in part on primary cell reference signal selection rules.

Figure 5:
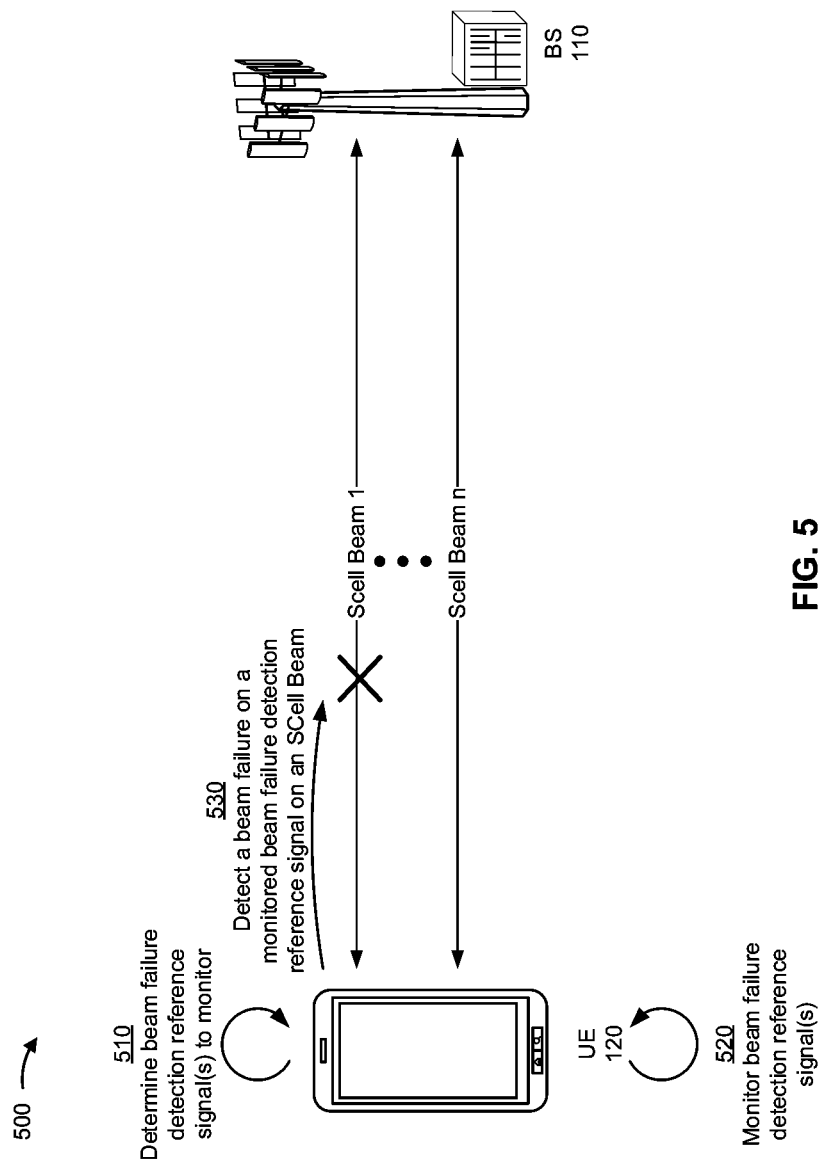
FIG. 5 is a diagram illustrating an example of beam failure detection reference signal selection for secondary cells, in accordance with various aspects of the present disclosure.

FIG. 5 is a diagram illustrating an example 500 of beam failure detection reference signal selection for secondary cells, in accordance with various aspects of the present disclosure. As shown in FIG. 5, example 500 includes a BS 110 and a UE 120.

As further shown in FIG. 5, and by reference number 510, UE 120 may determine beam failure detection reference signals to monitor. For example, UE 120 may identify one or more beam failure detection reference signals, of a set of possible beam failure detection reference signals, that UE 120 is to monitor to detect a beam failure.

In some aspects, UE 120 may select a particular quantity of beam failure detection reference signals. For example, UE 120 may determine a maximum quantity of beam failure detection reference signals, and may select up to the maximum quantity. In this case, the maximum quantity may be based at least in part on a quantity of secondary cells available to UE 120. For example, UE 120 may enable selection of a single beam failure detection reference signal for each secondary cell. Additionally, or alternatively, UE 120 may enable selection of a particular quantity of beam failure detection reference signals for each secondary cell. Additionally, or alternatively, UE 120 may enable selection of beam failure detection reference signals for a particular portion of available secondary cells. In some aspects, UE 120 may determine the maximum quantity of beam failure detection reference signals based at least in part on a quantity of secondary cell groups. In some aspects, UE 120 may determine a maximum quantity for each secondary cell (e.g., up to a threshold amount of beam failure detection reference signals selected for each secondary cell), different maximum quantities for different secondary cells (e.g., a first maximum quantity for a first secondary cell and a second maximum quantity for a second secondary cell), a maximum quantity for each secondary cell group, and/or the like.

In some aspects, UE 120 may determine the maximum quantity based at least in part on a stored configuration, on received signaling from BS 110, and/or the like. For example, UE 120 may determine the maximum quantity based at least in part on a stored configuration, and may provide a UE capability report to BS 110 indicating the maximum quantity, to enable BS 110 to determine the same quantity of beam failure detection reference signals for UE 120 as UE 120 is to determine. Additionally, or alternatively, BS 110 may determine the maximum quantity, or determine a different maximum quantity than is determined by UE 120, and may transmit signaling to UE 120 to identify the maximum quantity that is determined by BS 110 or override the maximum quantity that is determined by UE 120.

In some aspects, UE 120 may receive signaling from BS 110 identifying the set of beam failure detection reference signals. For example, BS 110 may determine a set of beam failure detection reference signals that UE 120 is to monitor, and may transmit control information to identify the set of beam failure detection reference signals.

In contrast, when UE 120 does not receive signaling from BS 110 identifying the set of beam failure detection reference signals, UE 120 may determine the set of beam failure detection reference signals based at least in part on a set of secondary cell reference signal selection rules. For example, UE 120 may select one or more beam failure detection reference signals, to monitor, that are quasi-co-located (QCL) (e.g., type-D QCL) with CORESETs of a secondary cell or secondary cell group to which UE 120 is connected.

Additionally, or alternatively, UE 120 may select a beam failure detection reference signal of a secondary primary cell of a secondary cell group to which UE 120 is connected. Additionally, or alternatively, UE 120 may select beam failure detection reference signals of secondary cells in a secondary cell group in which a BFQR or physical uplink control channel (PUCCH) group is configured. Additionally, or alternatively, UE 120 may select beam failure reference signals of secondary cells in which UE 120 is configured to communicate with BS 110 (e.g., UL and DL secondary cells).

In some aspects, UE 120 may resolve a conflict between a plurality of beam failure detection reference signals that UE 120 can select to monitor (e.g., a plurality that is greater than the maximum quantity of beam failure detection reference signals that UE 120 can select to monitor). For example, UE 120 may determine that a quantity of qualified CORESETs is greater than a maximum quantity of beam failure detection reference signals, and may select a qualified CORESET from which to select a beam failure detection reference signal based at least in part on one or more selection criteria. In this case, UE 120 may use, as selection criteria, information such as a periodicity of a corresponding reference signal (e.g., of the qualified CORESET), a CORESET identifier (e.g., a value of a CORESET index), a secondary cell identifier (e.g., of a secondary cell to which the qualified CORESET applies), a secondary cell group identifier (e.g., of a secondary cell group that includes the secondary cell to which the qualified CORESET applies), a PUCCH resource periodicity (e.g., for a BFRQ configured for the qualified CORESET), and/or the like. Additionally, or alternatively, UE 120 may use, as selection criteria for resolving a conflict when using secondary cell reference signal selection rules, a primary cell reference signal selection rule.

As further shown in FIG. 5, and by reference number 520, UE 120 may monitor the selected beam failure detection reference signals. For example, UE 120 may monitor one or more beam failure detection reference signals on one or more beams (e.g., secondary cell beams) to attempt to detect a beam failure when a beam failure occurs. In some aspects, UE 120 may perform one or more measurements when monitoring the one or more beam failure detection reference signals. For example, UE 120 may determine an RSRP, an RSPQ, and/or the like to determine whether a beam failure has occurred.

As further shown in FIG. 5, and by reference number 530, UE 120 may detect a beam failure. For example, UE 120 may detect the beam failure on a monitored beam failure detection reference signal on a secondary cell beam. In some aspects, UE 120 may detect the beam failure based at least in part on detecting a threshold measurement. For example, UE 120 may determine that an RSRQ has satisfied a threshold and may determine that a beam failure has occurred. In this case, UE 120 may trigger a beam failure recovery procedure, such as by transmitting a BFRQ, as described above.

As indicated above, FIG. 5 is provided as an example. Other examples may differ from what is described with respect to FIG. 5.

Figure 6:
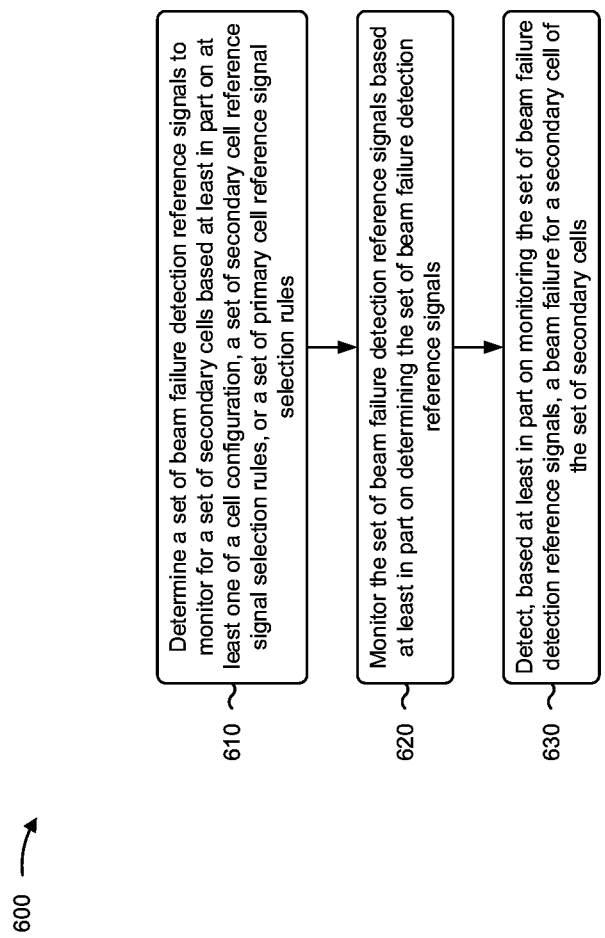
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., the first apparatus 305, UE 120, and/or the like) performs operations associated with beam failure detection reference signal selection for secondary cells.

As shown in FIG. 6, in some aspects, process 600 may include determining a set of beam failure detection reference signals to monitor for a set of secondary cells based at least in part on at least one of a cell configuration, a set of secondary cell reference signal selection rules, or a set of primary cell reference signal selection rules (block 610). For example, the UE (e.g., using controller/processor 280 and/or the like) may determine a set of beam failure detection reference signals to monitor for a set of secondary cells based at least in part on at least one of a cell configuration, a set of secondary cell reference signal selection rules, or a set of primary cell reference signal selection rules, as described above.

As further shown in FIG. 6, in some aspects, process 600 may include monitoring the set of beam failure detection reference signals based at least in part on determining the set of beam failure detection reference signals (block 620). For example, the UE (e.g., using antenna 252, DEMOD 254, MIMO detector 256, receive processor 258, controller/processor 280, and/or the like) may monitor the set of beam failure detection reference signals based at least in part on determining the set of beam failure detection reference signals, as described above.

As further shown in FIG. 6, in some aspects, process 600 may include detecting, based at least in part on monitoring the set of beam failure detection reference signals, a beam failure for a secondary cell of the set of secondary cells (block 630). For example, the UE (e.g., using antenna 252, DEMOD 254, MIMO detector 256, receive processor 258, controller/processor 280, and/or the like) may detect, based at least in part on monitoring the set of beam failure detection reference signals, a beam failure for a secondary cell of the set of secondary cells, as described above.

Process 600 may include additional aspects, such as any single aspect or any combination of aspects described below and/or in connection with one or more other processes described elsewhere herein.

In a first aspect, a quantity of beam failure detection reference signals in the set of beam failure detection reference signals is defined based at least in part on a size criterion.

In a second aspect, alone or in combination with the first aspect, the size criterion is determined on one of a per network basis, a per secondary cell group basis, or a per secondary cell basis.

In a third aspect, alone or in combination with one or more of the first and second aspects, process 600 includes reporting the size criterion to a base station via a UE capability message.

In a fourth aspect, alone or in combination with one or more of the first through third aspects, process 600 includes receiving information identifying the size criterion from a base station.

In a fifth aspect, alone or in combination with one or more of the first through fourth aspects, process 600 includes determining the size criterion based on a stored configuration.

In a sixth aspect, alone or in combination with one or more of the first through fifth aspects, the set of secondary cells is a secondary cell group with a quasi-co-location relationship defining one or more shared beams or a shared frequency band.

In a seventh aspect, alone or in combination with one or more of the first through sixth aspects, determining the set of beam failure detection reference signals includes determining that the cell configuration is configured for the UE and determining the set of beam failure detection reference signals using the cell configuration based at least in part on determining that the cell configuration is configured for the UE.

In an eighth aspect, alone or in combination with one or more of the first through seventh aspects, determining the set of beam failure detection reference signals includes determining that the cell configuration is not configured for the UE and determining the set of beam failure detection reference signals using the set of secondary cell reference signal selection rules based at least in part on determining that the cell configuration is not configured for the UE.

In a ninth aspect, alone or in combination with one or more of the first through eighth aspects, determining the set of beam failure detection reference signals using the set of secondary cell reference signal selection rules includes identifying a plurality of beam failure detection reference signals quasi-co-located with one or more CORESETs of the set of secondary cells and selecting the set of beam failure detection reference signals based at least in part on the plurality of beam failure detection reference signals.

In a tenth aspect, alone or in combination with one or more of the first through ninth aspects, determining the set of beam failure detection reference signals using the set of secondary cell reference signal selection rules includes identifying a plurality of beam failure detection reference signals quasi-co-located with a CORESET of a secondary primary cell of the set of secondary cells and selecting the set of beam failure detection reference signals based at least in part on the plurality of beam failure detection reference signals.

In an eleventh aspect, alone or in combination with one or more of the first through tenth aspects, determining the set of beam failure detection reference signals using the set of secondary cell reference signal selection rules includes identifying a plurality of beam failure detection reference signals quasi-co-located with one or more CORESETs of one or more cells of the set of secondary cells in which a beam failure recover request or physical uplink control channel group is configured and selecting the set of beam failure detection reference signals based at least in part on the plurality of beam failure detection reference signals.

In a twelfth aspect, alone or in combination with one or more of the first through eleventh aspects, determining the set of beam failure detection reference signals identifying a plurality of beam failure detection reference signals quasi-co-located with one or more CORESETs of one or more cells of the set of secondary cells for which uplink communication is configured and selecting the set of beam failure detection reference signals based at least in part on the plurality of beam failure detection reference signals.

In a thirteenth aspect, alone or in combination with one or more of the first through twelfth aspects, determining the set of beam failure detection reference signals using the set of secondary cell reference signal selection rules includes determining the set of beam failure detection reference signals based at least in part on at least one of a periodicity, a control resource set identifier, a secondary cell identifier, a secondary cell group identifier, a physical uplink control channel resource periodicity, or a beam failure recovery request periodicity.

In a fourteenth aspect, alone or in combination with one or more of the first through thirteenth aspects, determining the set of beam failure detection reference signals includes determining the set of beam failure detection reference signals based at least in part on the set of primary cell reference signal selection rules, wherein the set of primary cell reference signal selection rules includes a rule relating to at least one of a reference signal periodicity or a control resource set identifier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   selecting, using a set of secondary cell reference signal selection rules and when a cell configuration is not configured for the UE, a set of beam failure detection reference signals to monitor for a set of secondary cells, wherein the set of beam failure detection reference signals are quasi-co-located with one or more control resource sets of a set of secondary cells;
   monitoring the set of beam failure detection reference signals based at least in part on selecting the set of beam failure detection reference signals; and
   detecting, based at least in part on monitoring the set of beam failure detection reference signals, a beam failure for a secondary cell of the set of secondary cells.

2. The method of claim 1, wherein the set of beam failure detection reference signals is selected further based on a maximum quantity of beam failure detection reference signals for the set of secondary cells, and
   wherein the maximum quantity of beam failure detection reference signals is based at least in part on one of:
   a per network basis,
   a per secondary cell group basis, or
   a per secondary cell basis.

3. The method of claim 1, further comprising:
   reporting a maximum quantity of beam failure detection reference signals, for the set of secondary cells, to a network entity via a UE capability message.

4. The method of claim 1, further comprising:
   receiving, via signaling, information identifying a maximum quantity of beam failure detection reference signals for the set of secondary cells.

5. The method of claim 1, further comprising:
   determining a maximum quantity of beam failure detection reference signals for the set of secondary cells.

6. The method of claim 1, wherein the set of secondary cells is a secondary cell group with a quasi-co-location relationship defining one or more shared beams or a shared frequency band.

7. The method of claim 1, wherein the one or more control resource sets include a control resource set of a secondary primary cell of the set of secondary cells.

8. The method of claim 1, wherein the one or more control resource sets include one or more control resource sets of one or more cells of the set of secondary cells in which a beam failure recover request or physical uplink control channel group is configured.

9. The method of claim 1, wherein the one or more control resource sets include one or more control resource sets of one or more cells of the set of secondary cells for which uplink communication is configured.

10. The method of claim 1, wherein the set of beam failure detection reference signals are determined further based at least in part on at least one of:
    a periodicity,
    a control resource set identifier,
    a secondary cell identifier,
    a secondary cell group identifier,
    a physical uplink control channel resource periodicity, or
    a beam failure recovery request periodicity.

11. The method of claim 1, wherein the set of beam failure detection reference signals are selected further using a set of primary cell reference signal selection rules, and wherein the set oft reference signal selection rules includes a rule relating to at least one of:
    a reference signal periodicity, or
    a control resource set identifier.

12. The method of claim 1, wherein the set of beam failure detection reference signals is selected further based at least in part on a capability of the UE.

13. The method of claim 1, wherein the set of beam failure detection reference signals is selected further based on a maximum quantity of beam failure detection reference signals.

14. The method of claim 1, wherein the set of beam failure detection reference signals is selected further using a set of primary cell reference signal selection rules.

15. A user equipment (UE) for wireless communication, comprising:
    a memory; and
    one or more processors coupled to the memory, the one or more processors configured to cause the UE to:
    select, using a set of secondary cell reference signal selection rules and when a cell configuration is not configured for the UE, a set of beam failure detection reference signals to monitor for a set of secondary cells, wherein the set of beam failure detection reference signals are quasi-co-located with one or more control resource sets of a set of secondary cells;
    monitor the set of beam failure detection reference signals based at least in part on selecting the set of beam failure detection reference signals; and
    detect, based at least in part on monitoring the set of beam failure detection reference signals, a beam failure for a secondary cell of the set of secondary cells.

16. The UE of claim 15, wherein the set of beam failure detection reference signals is selected further based on a maximum quantity of beam failure detection reference signals for the set of secondary cells, and
    wherein the maximum quantity of beam failure detection reference signals is based at least in part on one of:
    a per network basis,
    a per secondary cell group basis, or
    a per secondary cell basis.

17. The UE of claim 15, wherein the one or more processors are further configured to cause the UE to:
    report a maximum quantity of beam failure detection reference signals, for the set of secondary cells, to a network entity via a UE capability message.

18. The UE of claim 15, wherein the one or more processors are further configured to cause the UE to:
    receive, via signaling, information identifying a maximum quantity of beam failure detection reference signals for the set of secondary cells.

19. The UE of claim 15, wherein the one or more processors are further configured to cause the UE to:
    determine a maximum quantity of beam failure detection reference signals for the set of secondary cells.

20. The UE of claim 15, wherein the set of secondary cells is a secondary cell group with a quasi-co-location relationship defining one or more shared beams or a shared frequency band.

21. The UE of claim 15, wherein the one or more control resource sets include a control resource set of a secondary primary cell of the set of secondary cells.

22. The UE of claim 15, wherein the one or more control resource sets include one or more control resource sets of one or more cells of the set of secondary cells in which a beam failure recover request or physical uplink control channel group is configured.

23. The UE of claim 15, wherein the one or more control resource sets include one or more control resource sets of one or more cells of the set of secondary cells for which uplink communication is configured.

24. The UE of claim 15, wherein the set of beam failure detection reference signals is selected further based at least in part on a capability of the UE.

25. The UE of claim 15, wherein the set of beam failure detection reference signals is selected further based on a maximum quantity of beam failure detection reference signals.

26. The UE of claim 15, wherein the set of beam failure detection reference signals is selected further using a set of primary cell reference signal selection rules.

27. A non-transitory computer-readable medium storing a set of instructions for wireless communication, the set of instructions comprising:
one or more instructions that, when executed by one or more processors of a user equipment (UE), cause the UE to:
select, using a set of secondary cell reference signal selection rules and when a cell configuration is not configured for the UE, a set of beam failure detection reference signals to monitor for a set of secondary cells, wherein the set of beam failure detection reference signals are quasi-co-located with one or more control resource sets of a set of secondary cells;
monitor the set of beam failure detection reference signals based at least in part on selecting the set of beam failure detection reference signals; and
detect, based at least in part on monitoring the set of beam failure detection reference signals, a beam failure for a secondary cell of the set of secondary cells.

28. The non-transitory computer-readable medium of claim 27, wherein the set of beam failure detection reference signals is selected further based on a maximum quantity of beam failure detection reference signals.

29. The non-transitory computer-readable medium of claim 27, wherein the set of beam failure detection reference signals is selected further using a set of primary cell reference signal selection rules.

30. An apparatus for wireless communication, comprising:
means for selecting, using a set of secondary cell reference signal selection rules and when a cell configuration is not configured for the UE, a set of beam failure detection reference signals to monitor for a set of secondary cells, wherein the set of beam failure detection reference signals are quasi-co-located with one or more control resource sets of a set of secondary cells;
means for monitoring the set of beam failure detection reference signals based at least in part on selecting the set of beam failure detection reference signals; and
means for detecting, based at least in part on monitoring the set of beam failure detection reference signals, a beam failure for a secondary cell of the set of secondary cells.

* * * * *